Patented Apr. 17, 1945

2,373,999

UNITED STATES PATENT OFFICE 2,373,999

CATALYTIC ALKYLATION

Philip D. Caesar and Alexander N. Sachanen, Woodbury, N. J., assignors to Socony-Vacuum Oil Company, Incorporated, New York, N. Y., a corporation of New York No Drawing. Application July 25, 1941, Serial No. 404,046

10 Claims. (Cl. 260—683.4)

This invention relates to the catalytic alkylation of paraffinic hydrocarbons with olefinic hydrocarbons. The invention is concerned particularly with the manufacture of high grade motor fuels by alkylating suitable isparaffins with suitable olefins in the presence of an aluminum chloride catalyst.

Alkylation of isoparaffins with olefins in the presence of catalysts consisting essentially of aluminum chloride activated by a promoter is known. For instance, Ipatieff et al. in Patents 2,112,846, 2,112,847, and 2,170,306 disclose such an operation for alkylating with the more reactive olefins at temperatures below zero degrees C., and in Patent 2,174,883 disclose such an operation at temperatures up to 40° C. for alkylating with the less reactive olefin ethylene. In Patent 2,236,099, Ipatieff and Pines disclose alkylation in the presence of aluminum chloride and hydrogen chloride in the temperature range of −50° C. to +60° C. Since it is understood that aluminum chloride alone is of low activity as an alkylation catalyst under the conditions of the prior art, appropriate activators in the form of halogen acids, e. g., hydrochloric acid, or water, which causes hydrochloric acid to be formed in situ, are used in combination with the aluminum chloride catalyst. When activated in this manner the aluminum chloride catalyst possesses a rather satisfying alkylating activity. However, relatively large amounts of aluminum chloride must be used, and as the catalyst consumption is high the process becomes expensive.

It is an object of this invention to provide a process for alkylating isparaffins with olefins in the presence of a catalyst consisting essentially of aluminum chloride under conditions that give the aluminum chloride a high alkylating activity. Another object is to provide a process wherein small amounts of aluminum chloride may be used to attain satisfactory yields. Other objects will be apparent from the following description of the invention.

We have discovered that by conducting the alkylation of isoparaffins with olefins in the presence of aluminum chloride at a temperature above about 50–60° C. and, if reaction in liquid phase is desired, below the critical temperature of the isoparaffin and olefin mixture, that the aluminum chloride has an outstanding activity that gives high yields of alkylate with relatively small amounts of catalyst, and undesirable side reactions are not appreciable. Preferably the temperature employed is in the neighborhood of 80 C.

Thus, for example, we have found at our elevated temperatures of alkylation, yields are obtained with 1% of aluminum chloride that are even greater than yields obtained with 5 or 6% of aluminum chloride, activated or not, at the lower temperatures of the prior art. Furthermore, while activators are necessary for feasible operations at temperatures below 50° C. with a catalyst consisting essentially of aluminum chloride, we have found that such activators not only are not necessary at temperatures above 50° C., but at these elevated temperatures, the activators apparently have no appreciable effect. In this connection, it might be mentioned that some hydrogen chloride is formed during the reaction at our high temperatures, but this HCl is of no importance to the process. If the reaction is performed in the liquid phase, the operating pressure depends merely on the temperature employed, and appears to have little effect itself on the catalytic alkylation. It will be found that a pressure of 70 to 400 pounds per square inch or still higher will be satisfactory for such an operation.

In the alkylation of an isoparaffin with an olefin heretofore, the isoparaffin must be maintained in great excess during the reaction. Thus, for instance, one mol of olefin is gradually added to 3 mols of isoparaffin to insure a great excess of isoparaffin at all times. On the contrary an advanced alkylation takes place in the present process even without a large excess of isoparaffin, e. g., by mixing 3 mols of isobutane in toto with 1 mol of amylene, giving a high yield of alkylate under conditions that would yield principally olefinic polymerization products in the processes of the prior art. It is to be understood, however, that our process may be, and preferably is, operated with an excess of isoparaffin.

A total yield of alkylate up to 97% of the theoretical has been attained, and a yield of alkylate boiling in the range of aviation gasoline up to 91% of the theoretical has been produced. It should be pointed out that the high yield of alkylate, boiling in the range of aviation gasoline, is an advantage of our method, whereas in the prior art a considerable proportion of high boiling fractions, boiling in the range of motor gasoline (up to 210° C.) and much higher, is obtained. The fractions boiling in the range of gasolines are completely saturated (iodine number about zero), and they have gravities corresponding to pure paraffins. It is interesting to note that the alkylate product from isobutane and ethylene contains a considerable portion of 2,3-di-methyl butane, approximately up to 40–45% of the alkylate. In addition, such alkylate contains up to 30% isopentane.

The aviation alkylate is rich in low boiling fractions and has a high octane number. For instance, the aviation alkylate produced by alkylating isobutane with amylene has a clear octane number 82.4 (by the Motor method); that produced by isobutane with propylene, 82.7; and that produced by isobutane with ethylene, 86 to 88.

Since the alkylates are purely paraffinic and completely saturated, their response to tetraethyl lead is good, for example, a fraction having a clear octane number of 88, has an octane number of 94 with 1 cc. tetraethyl lead.

The table set out below illustrates the marked effect of higher temperatures in alkylation of isobutane with ethylene catalyzed by aluminum chloride alone.

| Temp. | Per cent AlCl₃ with respect to charge | Yield of alkylate with respect to theoretical | Time of reaction |
|---|---|---|---|
| | | Per cent | Hours |
| 28° C | 5.6 | 36 | 3 |
| 82° C | 5.0 | 84 | 1¼ |
| 28° C | 1.0 | 9 | 1 |
| 82° C | 1.0 | 77 | 1 |

The theoretical yield is calculated with reference to the olefin charged, for instance, for the alkylation of isobutane with ethylene, according to the reaction:

$$C_4H_{10} + C_2H_4 = C_6H_{14}$$

Each of the alkylations reported in the above table was performed in an apparatus provided with a stirrer. The apparatus was charged in each case with the same amounts of isobutane and ethylene, the latter introduced gradually under a maximum pressure of 150 lbs. to 300 lbs. per square inch up to a final mol ratio of 1:3 with respect to butane. That temperature is a very potent factor becomes apparent when the above results are compared with alkylations involving the use of activators. A very efficient activator described in application Serial No. 408,995, filed August 30, 1941 by the present applicants, is trichloracetic acid. When that activator was used in amounts equal to 30% of the weight of the catalyst in reactions substantially identical with those of the above table the following results were obtained:

| Temp. | Per cent AlCl₃ | Yield of alkylate | Time |
|---|---|---|---|
| | | Per cent | Hours |
| 28° C | 6 | 51 | 1¼ |
| 28° C | 1 | 12 | 1 |

The amount of aluminum chloride employed in the process of this invention is relatively small, preferably around 5%, based on weight of the charge. As shown by the results set forth above, good yields are obtained with as little as 1% of catalyst. It has been found that amounts ranging between about 1% and about 10% are usually suitable for efficient commercial operation, but amounts ranging between about 1% and about 5% are preferred in order to substantially reduce consumption of catalyst.

We claim:

1. The process which comprises reacting a branched chain paraffinic hydrocarbon with an olefinic hydrocarbon in the presence of a catalyst consisting essentially of aluminum chloride at a temperature not substantially below about 60° C.; whereby the addition of activators to the reaction mixture is avoided.

2. The process which comprises reacting a branched chain paraffinic hydrocarbon with an olefinic hydrocarbon in the presence of a catalyst consisting essentially of aluminum chloride in an amount of equal to from about 1% to about 10% of the weight of said hydrocarbons at a temperature not substantially below about 60° C.; whereby the addition of activators to the reaction mixture is avoided.

3. The process which comprises reacting a branched chain paraffinic hydrocarbon with an olefinic hydrocarbon in the presence of a catalyst consisting essentially of aluminum chloride in an amount equal to about 5% of the weight of said hydrocarbons at a temperature not substantially below about 60° C.; whereby the addition of activators to the reaction mixture is avoided.

4. The process which comprises reacting isobutane with ethylene in the presence of a catalyst consisting essentially of aluminum chloride at a temperature not substantially below about 60° C.; whereby the addition of activators to the reaction mixture is avoided.

5. The process which comprises reacting a branched chain paraffinic hydrocarbon with ethylene in the presence of a catalyst consisting essentially of aluminum chloride in a amount equal to about 1% to about 10% of the weight of ethylene and said hydrocarbon at a temperature not substantially below about 60° C.; whereby the addition of activators to the reaction mixture is avoided.

6. The process which comprises reacting a branched chain paraffinic hydrocarbon with ethylene in the presence of a catalyst consisting essentially of aluminum chloride in an amount equal to about 1% to about 5% of the weight of ethylene and said hydrocarbon at a temperature not substantially below about 60° C.; whereby the addition of activators to the reaction mixture is avoided.

7. The process which comprises reacting isobutane with ethylene in the presence of a catalyst consisting essentially of aluminum chloride in an amount equal to about 1% of the weight of the reactants at a temperature not substantially below about 60° C.; whereby the addition of activators to the reaction mixture is avoided.

8. The process which comprises reacting a branched chain paraffinic hydrocarbon with an olefinic hydrocarbon in the presence of a catalyst consisting essentially of aluminum chloride at a temperature of about 80° C.; whereby the addition of activators to the reaction mixture is avoided.

9. The process which comprises reacting a branched chain paraffinic hydrocarbon with an olefinic hydrocarbon in the presence of a catalyst consisting essentially of aluminum chloride at a temperature not substantially below about 60° C. and below the critical temperature of the mixture of said hydrocarbons; whereby the addition of activators to the reaction mixture is avoided.

10. The process which comprises reacting isobutane with ethylene in the presence of a catalyst consisting essentially of aluminum chloride in an amount equal to about 1% by weight of the reactants at a temperature of about 80° C.; whereby the addition of activators to reaction mixture is avoided.

PHILIP D. CAESAR.
ALEXANDER N. SACHANEN.